March 24, 1942.  T. FLEISCHMANN  2,277,095
ELECTRIC ROTARY HAND TOOL
Filed Feb. 26, 1940
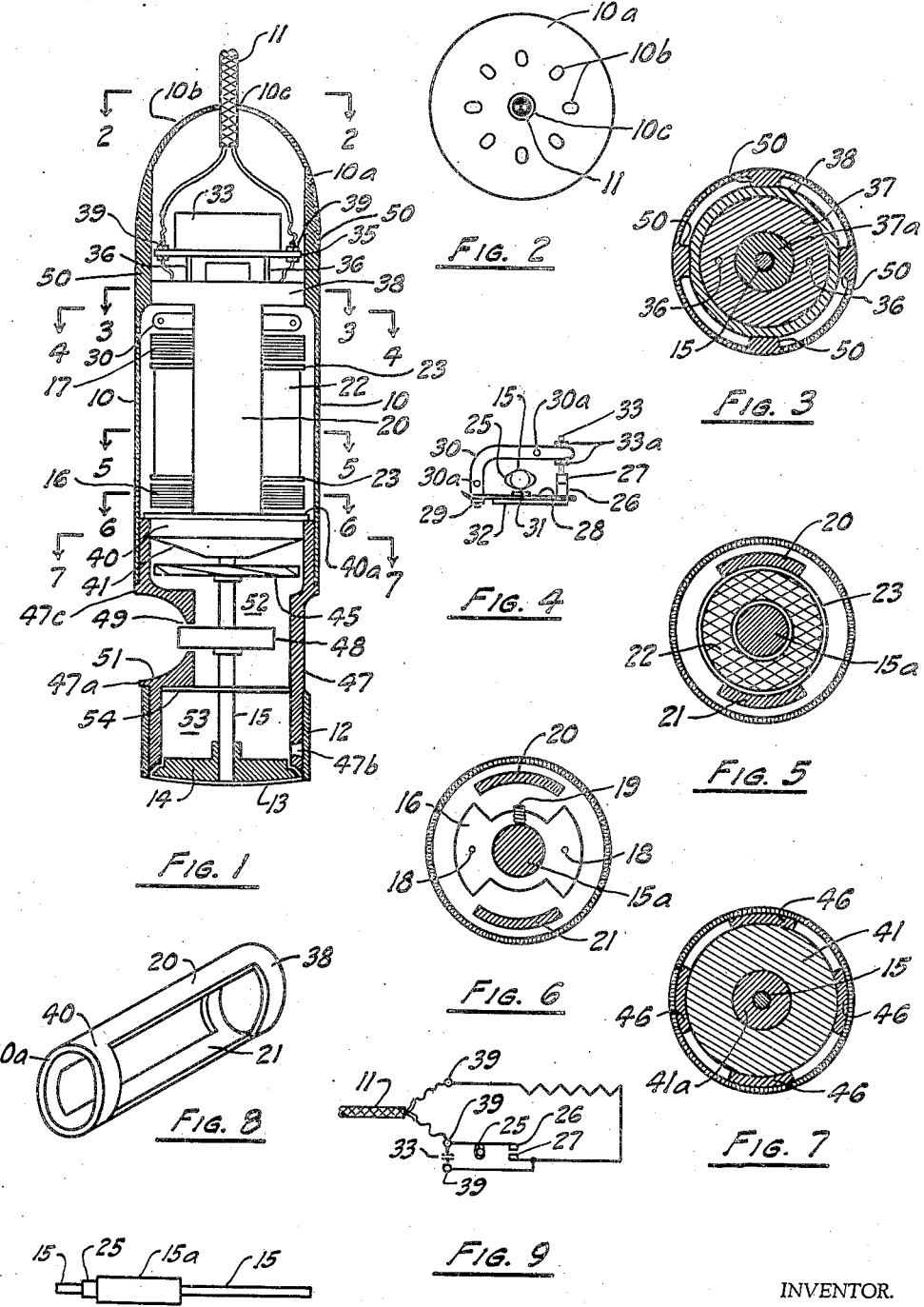
INVENTOR.
THEODORE FLEISCHMANN
BY Virgil E. Woodcock
ATTORNEY.

Patented Mar. 24, 1942

2,277,095

UNITED STATES PATENT OFFICE 2,277,095

ELECTRIC ROTARY HAND TOOL

Theodore Fleischmann, New York, N. Y., assignor to Raylite Electric Corporation, Long Island City, N. Y., a corporation of New York Application February 26, 1940, Serial No. 320,962

12 Claims. (Cl. 172—36)

My invention relates to electric rotary hand tools, more particularly to a shaving implement or tool of the type which has a cutter driven by an electric motor, and has for an object the provision of a reliable, powerful, driving motor of unusually small size, and of exceptionally low cost.

Heretofore electric rotary hand tools, including shaving implements, have been constructed by the relatively complicated assembly of numerous parts within a segmental casing. The electric motor provided for such devices included a stator element or field structure of relatively large dimensions, and a coil disposed at right angles to the axis of the rotor.

In carrying out my invention, in one form thereof, I provide a cylindrical, or symmetrical-shaped case, preferably bullet-shaped, and substantially closed at one end thereof. The motor is disposed within this case, in spaced relation with the inner walls thereof, and all elements of the motor, such as the magnetic stator, the energizing coil, the shaft, and the polar elements, are disposed with their respective longitudinal axes of symmetry coinciding with the longitudinal axis of said case. Inwardly extending lugs, formed integrally with the case, support the magnetic stator at one end, and a collar, provided with legs which engage and support the opposite end of the magnetic stator, snugly fits within the opposite end of the case. The collar is provided with an enlarged portion within which is located a fan connected to the motor shaft. The fan forces air between the legs of the collar, in cooling relation with the case, and around the motor, the air being discharged through a plurality of openings provided in the bullet-shaped end of the casing. The rapid flow of air in contact with the casing keeps it cool and also serves to cool the motor.

The collar is provided with connected openings which are eccentric with respect to each other, so that a starting button mounted on the motor shaft may be introduced into the collar through one opening and then moved so that the starting disc extends outwardly through a notch in the collar for engagement by the thumb, for the starting of the motor, and leaving the shaft concentric of the other opening. By reason of the collar the motor may be constructed as a unitary structure and independently of the particular device it is to operate.

Further in accordance with my invention, the motor itself is of the reluctance type, wherein the torque is developed by reason of the fact that polar elements forming the rotor tend to move from positions of maximum reluctance to positions of minimum reluctance. By closing the motor circuit during those periods when the rotor elements are spaced from the polar elements of the stator, and opening the circuit as they approach each other, a substantial and relatively continuous torque is developed.

To improve the motor operation and to decrease its cost, the magnetic stator consists of two or more bars (which form the stator poles) connected at their respective ends by short cylinders, or rings, formed integrally therewith. In this manner a rugged single-piece stator is provided. The cylinders or rings are utilized to support the motor bearings, which may be pressed into the rings, thus insuring perfect alignment of the shaft within the stator shell.

My invention, together with other objects and advantages thereof relating to constructional features and improved motor operation, will be more fully understood upon reference to the following description and the accompanying drawing, forming a part of this specification and of which:

Fig. 1 is a plan view of the motor, with the casing and collar, and certain other elements, in section;

Fig. 2 is an end view of the rounded, partially closed, end of the casing;

Fig. 3 is a sectional view taken on the line 3, 3 of Fig. 1;

Fig. 4 is a fractional view, partly in section, taken on the line 4, 4 of Fig. 1;

Fig. 5 is a sectional view taken on the line 5, 5 of Fig. 1;

Fig. 6 is a sectional view taken on the line 6, 6 of Fig. 1;

Fig. 7 is a sectional view taken on the line 7, 7 of Fig. 1;

Fig. 8 is a perspective view of the magnetic stator shell;

Fig. 9 is a simplified diagram showing the motor connections; and

Fig. 10 is a side view of the motor shaft.

Referring now to the drawing, I have shown my invention in one form as applied to a shaving implement comprising a case 10, rounded and substantially closed at one end, 10a thereof. The end 10a is provided with a plurality of openings 10b for the discharge of air from the case, and with a central opening 10c for an electric power supply cord 11, which may be connected to either an alternating or direct current source of supply. The shaving head 12, which per se forms no part of my invention, may be of any suitable type, including a guard 13 and a cutter element 14, secured to the steel motor shaft 15; and provided with one or more cutting blades.

In accordance with my invention, the motor as a whole, and the motor shaft 15 are disposed concentrically of the case 10. Spaced from each other and secured to the shaft 15 are two laminated polar elements 16 and 17, preferably of identical shape, and occupying the same angular positions on the shaft 15. The polar element 16, best shown in Figs. 1 and 6 comprises a plurality of magnetizable laminations of transformer steel secured together as by rivets 18, and as a unit fastened to an enlarged section 15a of the shaft 15 by means of a set screw 19, although it is to be understood any other securing and fastening means may be utilized. It will thus be seen that the rotor or rotatable part of the motor is in perfect dynamic balance.

The rotor poles or elements 16 and 17 cooperate with stationary poles or elements formed by two bars 20 and 21, which form a part of the stator shell. Nesting within the case, and between the elements 16 and 17 is the energizing coil 22, preferably wound upon a spool 23, the outer ends of which snugly and tightly fit against the inner curved surfaces of stationary elements 20 and 21. Upon energization of the coil 22 magnetic flux is produced through a low-reluctance path which extends concentrically of the coil by way of an enlarged section 15a of the shaft 15, outwardly through the rotor poles 16 and 17 and to the stator poles 20 and 21. When the rotor poles 16 and 17 occupy positions, as shown in Fig. 6, these poles tend to move to positions of minimum reluctance or to positions wherein the poles 16 and 17 are in alignment with, or form the shortest path between, the cooperating poles 20 and 21.

As the elements 16 and 17 move toward the positions of minimum reluctance, a cam 25, Figs. 4, 9 and 10, preferably formed integrally with the shaft 15, moves contact 26 to interrupt the motor circuit. The rotating movable parts then coast, by momentum, until the elements 16 and 17 again occupy positions, like the one shown in Fig. 6, at which time the cam 25 is moved to a circuit-closing position to close the motor circuit, as by movement of the contact 26 against its cooperating stationary contact 27. The contacts 26 and 27 are preferably formed of tungsten or other suitable arc-resistant material. The movable contact 26 is preferably carried by a spring 28, suitably secured, as at 29, to a body 30 formed of insulating material. The spring 28 preferably carries a wear-resistant element 31, which is engaged by the cam 25, and may also include a backing member 32, which localizes the bending of the spring element 28 within the region adjacent its support. The stationary contact 27 is supported on a stud 33 threaded within the insulating body 30 for adjustment relative to contact 26. The time that the contacts and motor circuit remain closed has an important bearing on the operation of the motor. By means of the threaded stud 33, provided with lock nuts 33a, the contacts 26 and 27 may be spaced from each other by varying amounts to change the time the contacts occupy open and closed circuit positions, as may be desired.

In the preferred form of my invention, the contacts are adjusted so that the closed circuit position is maintained for a time interval somewhat in excess of the time contacts remain in the open position; that is to say, the coil 22 is energized during a greater angular movement of the poles 16 and 17 than the angular movement thereof with the coil 22 deenergized. The rotor poles 16 and 17 are secured to the enlarged portion 15a of the shaft by the set screws 19, Fig. 6, in such angular relation with respect to the crests of the cam 25 that the motor circuit is closed as such poles approach the position shown in Fig. 6, and the circuit is interrupted as the poles 16 and 17 approach the positions of minimum reluctance. To reduce and substantially eliminate arcing between the contacts 26 and 27 as a result of the opening of the motor circuit, a capacitor 33 is preferably connected in shunt across the contacts 26 and 27. The capacitor may have a capacitance of about one-tenth microfarad for a coil having about 1700 turns of #30 wire.

The capacitor 33 is preferably mounted within the rounded end 10a of the casing and upon a sub-panel 35 carried by studs 36 extending from the bearing-insert 37, Fig. 3. Three binding posts 39 are also carried by the sub-panel 35 to facilitate the making of the connections to the motor, as shown in Fig. 9. Thus all motor accessories are carried by it, and independently of case 10.

The bearing element 37, Fig. 3, is cylindrical in form and is pressed into a cylindrical end 38 of the stator. The outer portion of element 37 may be formed of aluminum or other suitable non-magnetic material, and may support at its center an insert 37a formed of a suitable composition, including a lubricant such as graphite, so that the insert 37a forming the motor bearing need not be lubricated. The cylindrical end portion 40 at the opposite end of the motor is provided with a bearing element 41, identical in construction with the element 37, and it is provided with a second self-lubricating insert 41a, except that one end of cylindrical element 41 is in the form of a frustum of a cone, the purpose of which will be explained hereinafter. By the press fit of the two elements 37 and 41 within the cylindrical end portions 38 and 40 of the stator shell, the shaft and rotor poles 16 and 17 are automatically supported concentrically of the stator shell without need of adjustments, and because of the accuracy of the positioning obtained in accordance with my invention, the clearance between the rotor poles and the associated stator elements may be less than heretofore, with the beneficial results of increased torque and better, more efficient, operation.

The construction of the unitary stator shell, Fig. 8, is an important feature of my invention, and the integral connection of the rings or cylindrical end portions 38 and 40 with the elongated stationary poles 20 and 21 does not adversely affect the operation of the motor; on the contrary the operation of the motor is improved and better than without the interconnecting magnetic paths. There is no effective loss of torque or magnetic flux, partly because the bearing inserts 37 and 41 are of non-magnetic material, and partly because the enlarged portion 15a of the shaft extends only between the poles 16 and 17, themselves located intermediate, and spaced inwardly from, the cylindrical end portions 38 and 40.

The stator shell, Fig. 8, may be conveniently constructed from tubing made of a good grade magnetic steel such as used in transformers by simply milling or cutting therefrom the sections of metal between the poles 20 and 21. Thus a plurality of shells may be simultaneously constructed from a single length of tubing or pipe by a plurality of adjacently situated milling machines, and the pipe thereafter severed to separate the several shells one from the other. The tolerances may be generous, so reducing the number of rejects, except that the inner surface of the pipe or tubing shell be fairly smooth and uniformly circular.

For long continued operation of a motor constructed in accordance with my invention, I have observed that the motor temperature rises, not to a high or damaging degree, but enough so that heat is transmitted to the casing 10, which may feel warm by the hand gripping it. To the user this warmth is annoying, and a detriment to the sale of hand tools or shaving implements, since there appears in the mind of the user an uncertainty as to how hot the instrument may become, and this gives rise to an unwarranted fear of the instrument.

Further in accordance with my invention, I provide a fan 45, secured to the motor shaft 15 and nesting within the legs 46 of a collar 47. Also within the collar 47 is a starting disc 48, secured to the shaft 15 and extending through an opening 49 into a thumb recess 51.

It will be observed that the outer surfaces of the legs 46 engage the inner surface of the case 10, and that the legs 46 fit over a reduced section of the cylinder 40 and against a flange 41a thereof. Thus the legs 46 of the collar 47 support one end of the motor within the case 10 while the opposite end thereof is supported by inwardly extending lugs 50, formed integrally with the case and adjacent the substantially closed end 10a thereof. The legs 46 are pressed onto the cylinder 40, the press fit rigidly uniting the motor shell and the collar 47.

Upon operation of the motor the fan draws air into the case through the opening around the starting disc 48 and propels the air at high velocity outwardly over the frustum of the cone forming a part of bearing element 41, thence through the openings between the legs 46 and along the inner surface of the casing 10. The rapid flow of air along the case 10 keeps it cool and also reduces or limits the operating temperature of the motor. The air passes between the lugs or ledges 50 and out the rear end of the housing 10 through the openings 10b. The frustum of the cone or bearing element 41 aids in producing smooth flow of air outwardly of the motor. Also the bearing inserts form closure members for the stator shell, thus insuring maximum flow of cooling air over the inner surface of the case 10.

My invention is also concerned with the ease with which the motor may be assembled, which contributes to a materially decreased cost of production. The capacitor 33, and binding posts 39 may be mounted on the sub-panel 35. The circuit controller or switch assembly is then secured to the bearing element by screws 30a. The bearing element 37 is then pressed into the ring or cylinder 38 of the stator shell and by means of the studs or bolts 36 the panel is secured to it. The motor shaft is then inserted, the reduced end extending through bearing insert 37a and the cam element being in operative relation to the element 31 of contact arm 28. The rotor pole 17 is inserted, followed by the spool-wound coil 22. The spool 23 has an outer diameter such that the spool must be pressed into position, the fiber or insulating material of the spool deforming slightly, rigidly to hold it in place. The rotor pole 16 is then inserted, followed by the pressing of the bearing element 41 into cylinder or ring 40. The rotatable parts are then automatically centered within the shell. The poles 16 and 17 are then secured to the shaft by set screws in correct relation to the crests of cam 25 and stator poles 20 and 21 and the contact 27 suitably adjusted. The motor shaft 15 extends outwardly of the motor a distance sufficient to form a direct driving connection with the shaver head or other driven device.

The fan 45 is then secured to motor shaft 15 as by a set screw, and the starting disc 48 loosely placed on the shaft 15. The collar 47 is then moved over the disc 48, the eccentricity of the openings 53 and 52 permitting the disc 48 to be moved through opening 53, thence into opening 52 and the collar then moved to bring the edge of the disc outwardly through the slot 49 formed in the thumb recess 50. When the disc 48 protrudes through slot 49, the shaft 15 is concentric of the opening 53, and the collar 47 may then be pushed into place with its legs 46 engaging the reduced end of ring 40 and its flange 40a. This is a press fit, uniting the collar 47 and the motor shell and if desired additional securing means may be utilized. The disc 48 is secured to shaft 15 by a set screw located in its hub which may be reached through the open end of collar 47, or a set screw may be tightened from an opening through the periphery of the disc 48. Thereafter a washer 54 is pressed against a peripheral ledge within the collar 47 to prevent entrance of foreign particles, hair and the like, into the motor proper. The cutter 14 is then secured to the shaft by means of a set screw which may be reached through opening 47b in the collar, and the cutter head 12 as a unit is placed into position with the inner end resting against a flange 47a. The head 12 may be secured in place by means of bayonet slots and pins (not shown).

The electric cord 11 is now brought through opening 10c of case 10 and the wires thereof are secured to terminals 39. The case 10 is now slipped over the motor unit as a whole and secured in place by any suitable means such as cement or screws. The assembly is now complete, with the open end of the case 10 against flange 47c of collar 47.

If instead of a shaver head a tool of another kind is to be produced, it will be observed that only the head 12 need be changed. Thus a pencil sharpener, electric eraser, drill or polishing tool may be readily produced by substituting a suitable head for the shaver head 12, its guard 13 and cutter elements 14.

While I have shown a particular embodiment of my invention, it will be understood that I do not limit myself thereto, since many modifications may be made, and I, therefore, contemplate by the appended claims to cover any such modifications as fall within the spirit and scope of my invention.

What I claim is:

1. In an electric rotary tool, the combination with a unitary cylindrical case, rounded and substantially closed at one end and open at the opposite end thereof, an electric motor having a magnetic stator of less diameter than the inner diameter of said case, a coil nesting within said stator, a shaft, and polar elements, all of said named parts of said motor having their respective longitudinal axes of symmetry coincident with the longitudinal axis of said case, means adjacent said closed end of said case for supporting one end of said stator in spaced relation with said case, a collar having legs engaging both the inner wall of said case and said stator for supporting the opposite end of said stator in spaced relation with said case, said motor shaft extending centrally through said collar, said collar having annular spaces therethrough disposed eccentrically with respect to each other, a fan disposed within one of said spaces, a starting element driven by said shaft and disposed within a second of said spaces with a peripheral portion extending exteriorly of said collar, and a driven element concentric with a third of said spaces, the eccentricity of said second and third spaces providing for the movement of said element through said one space into said second space and thence into its position with said peripheral portion exteriorly of said collar and said shaft concentric with said third space.

2. An electric rotary tool comprising, in combination, a unitary elongated case having an open end and a closed end with air-outlet openings therethrough, an elongated electric motor of less diameter than said case, means adjacent said closed end of said case for supporting one end of said motor concentrically of said case and in spaced relation therewith, a collar having legs extending within the open end of said case for supporting the opposite end of said motor concentrically of said case, said collar having an annular space therein of substantially the diameter of said motor, a fan disposed within said space and driven by said motor to force air around the motor, in cooling relation to the case and out said air-outlet openings, said collar having additional annular space, a starting element mechanically connected to said motor and extending outwardly of said collar from a second of said spaces for manual movement thereof to start said motor, closure elements disposed at opposite ends of said motor for maintaining said flow of air within, and longitudinally of, the space between said case and said motor.

3. An electric motor for a rotary tool comprising, in combination, a magnetic stator shell in the form of a cylinder with sections thereof removed intermediate the opposite ends thereof to form elongated polar elements connected at their ends by cylinders, non-magnetic inserts disposed within each of said cylinders and including bearings concentric of said shell, a motor shaft carried by said bearings co-axially of said shell, polar elements secured to said shaft and spaced inwardly from each of said cylinders and spaced from each other, and an energizing coil disposed between said last-mentioned polar elements and arranged co-axially of said shaft.

4. An electric motor comprising elongated magnetic stator poles the opposite ends of which are integrally secured to relatively narrow magnetic cylinders, non-magnetic inserts disposed within said cylinders and provided with bearings concentrically thereof, a motor shaft supported by said bearings for rotation co-axially of said shell, magnetic rotor poles secured to said shaft in positions respectively spaced inwardly from each of said cylinders, an energizing coil co-axial of said shaft and disposed between said rotor poles, said latter poles overlying the opposite ends of said coil and the outer surfaces of which are slightly spaced from the inner surfaces of said stator poles when in registry therewith.

5. An electric motor comprising elongated magnetic stator poles the opposite ends of which are integrally secured to relatively narrow magnetic cylinders, non-magnetic inserts disposed within said cylinders and provided with openings concentrically thereof, a motor shaft supported within said openings for rotation co-axially of said cylinders, rotor poles secured to said shaft in positions respectively spaced inwardly from said cylinders, an energizing coil co-axial of said shaft and disposed between said rotor poles, said latter poles overlying the opposite ends of said coil and the outer surfaces of which are slightly spaced from the inner surfaces of said stator poles when in registry therewith, said motor shaft having a materially larger cross-sectional area between said rotor poles than it has beyond either side of said rotor poles and within said cylinders.

6. An electric motor comprising elongated magnetic stator poles, the opposite ends of which are integrally secured to relatively narrow magnetic cylinders, non-magnetic inserts disposed within said cylinders and provided with openings concentrically of said shell, a motor shaft supported within said openings for rotation co-axially of said shell, rotor poles secured to said shaft in positions respectively spaced inwardly of said cylinders, an energizing coil co-axial of said shaft and disposed between said rotor poles, said latter poles overlying the opposite ends of said coil and the outer surfaces of which are slightly spaced from the inner surfaces of said stator poles when in registry therewith, a circuit controller for said coil, operable by said shaft, and means for supporting said controller from one of said inserts.

7. An electric motor comprising elongated polar elements the opposite ends of which are integrally secured to relatively narrow cylinders, non-magnetic inserts disposed within said cylinders and provided with openings concentrically of said cylinders, a motor shaft supported within said openings for rotation co-axially of said cylinders, rotor poles secured to shaft in positions respectively spaced inwardly of said cylinders, an energizing coil co-axial of said shaft and disposed between said rotor poles, said latter poles overlying the opposite ends of said coil and the outer surfaces of which are slightly spaced from the inner surfaces of said stator poles, said motor shaft having a materially larger cross-sectional area between said rotor poles than it has beyond either side of said rotor poles, and accessories for said motor supported by one of said inserts comprising a capacitor and circuit controlling contacts.

8. An electric rotary tool comprising, in combination, a stator shell formed of magnetic steel, said shell including relatively narrow cylinders at opposite ends thereof and integrally interconnected by stator poles equally spaced circumferentially around said cylinders, bearings supported within each of said cylinders, a shaft supported by said bearings, rotor elements spaced from each other on said shaft, an energizing coil intermediate said elements, within said shell, and circumscribing said shaft, one of said cylinders having a portion thereof of reduced diameter and forming a flange, tool head into which said motor shaft extends, a collar interconnecting said head and said shell comprising means for tightly gripping said reduced portion of said cylinder, said collar having an intermediate portion of materially reduced diameter provided with a slot therein, and a starting disc secured to said shaft, the periphery thereof extending outwardly of said slot.

9. An electric rotary tool comprising, in combination, a stator shell formed of magnetic steel, said shell including relatively narrow cylinders at opposite ends thereof and integrally interconnected by stator poles equally spaced circumferentially around said cylinders, bearings supported within each of said cylinders, a shaft rotatably supported by said bearings, rotor elements spaced from each other on said shaft, an energizing coil intermediate said elements, within said shell, and circumscribing said shaft, one of said cylinders having a portion thereof of reduced diameter and forming a flange, tool head into which said motor shaft extends, a collar interconnecting said head and said shell comprising means for tightly gripping said reduced portion of said cylinder, said collar having an enlarged portion, a fan supported by the motor shaft within said enlarged portion, said collar having a reduced portion with a slot therein, a starting disc secured to said motor shaft and extending outwardly of said slot.

10. An electric rotary tool comprising, in combination, a stator shell formed of magnetic steel, said shell including relatively narrow cylinders at opposite ends thereof and integrally interconnected by stator poles equally spaced circumferentially around said cylinders, bearings supported within each of said cylinders, a shaft rotatably supported by said bearings, rotor elements spaced from each other on, and secured to, said shaft, an energizing coil intermediate said elements, within said shell, circumscribing, and spaced from said shaft, one of said cylinders having a portion thereof of reduced diameter and forming a flange, tool head into which said motor shaft extends, a collar interconnecting said head and said shell comprising legs secured to said reduced portion of said cylinder, said collar having an enlarged portion, a fan supported by the motor shaft within said enlarged portion for circulating cooling air between said legs and over said motor, said collar having a reduced portion with a slot therein, a starting disc secured to said motor shaft and extending outwardly of said slot, a case for said motor adjoining said collar, and means including said collar for spacing said shell within said collar to provide a passage for said cooling air between said shell and said case.

11. In an electric rotary tool, the combination with a unitary cylindrical case, rounded and substantially closed at one end and open at the opposite end thereof, an electric motor having a magnetic stator of less diameter than the inner diameter of said case, a coil nesting therein, a shaft, and polar elements secured to said shaft, all of said named parts of said motor having their respective longitudinal axes of symmetry coincident with the longitudinal axis of said case, means adjacent said closed end of said case for supporting one end of said stator in spaced relation with said case, a collar having legs engaging both the inner wall of said case and said stator for supporting the opposite end of said stator in spaced relation with said case, said motor shaft extending through said collar, said collar having three annular spaces therethrough and the intermediate space disposed eccentrically with respect to end spaces, a fan disposed within one of said spaces, and a starting element connected to said motor shaft and disposed within a second of said spaces with a peripheral portion extending exteriorly of said collar, the eccentricity of said openings providing for the movement of said element through said one space into said second space and thence into its position with said peripheral portion exteriorly of said collar and the shaft concentric with said end spaces, and a driver element concentric with said end spaces and secured to said shaft.

12. An electric rotary tool comprising in combination a unitary elongated case having an open end and a closed end with air-outlet openings therethrough, an elongated electric motor of less diameter than said case, means adjacent said closed end of said case for spacing one end of said motor concentrically within said case, a cylinder adjacent one end of said motor, a collar having legs extending within the open end of said casing and over said cylinder for supporting the opposite end of said motor concentrically within said case, said collar having a flange engaging the open end of said case, and an annular space therein of substantially the diameter of said motor, a fan disposed within said space and driven by said motor to force air around the motor, in cooling relation to the case and out said air-outlet openings, a bearing element within said cylinder and forming a closure to said motor, said collar having a second annular space eccentric with respect to said first space, a starting element mechanically connected to said motor and extending outwardly of said collar through said second space for manual movement thereof to start said motor, said collar having a third annular space, and a driver element connected to said motor within said third space.

THEODORE FLEISCHMANN.